United States Patent [19]

Lechner

[11] 4,378,472
[45] Mar. 29, 1983

[54] TWO TO FOUR WIRE HYBRID CIRCUIT ARRANGEMENT FOR A PULSE CODE MODULATED TIME MULTIPLEX TELECOMMUNICATION SYSTEM

[75] Inventor: Robert Lechner, Otterfing, Fed. Rep. of Germany

[73] Assignee: Siemens Aktiengesellschaft, Berlin and Munich, Fed. Rep. of Germany

[21] Appl. No.: 127,568

[22] Filed: Mar. 6, 1980

[30] Foreign Application Priority Data

Mar. 26, 1979 [DE] Fed. Rep. of Germany ....... 2911866

[51] Int. Cl.³ .............................................. H04B 1/58
[52] U.S. Cl. ......................... 179/170 D; 179/170 NC
[58] Field of Search ........... 370/6; 179/170 R, 170 D, 179/170 NC, 170 T

[56] References Cited

U.S. PATENT DOCUMENTS

| | | | |
|---|---|---|---|
| 3,215,788 | 11/1965 | Oswald | 179/170 D |
| 3,855,431 | 12/1974 | Stewart | 179/170 NC |
| 3,903,378 | 9/1975 | Lee | 179/170 R |
| 4,004,109 | 1/1977 | Boxall | 179/170 NC |
| 4,074,087 | 2/1978 | Blake | 179/170.2 |

FOREIGN PATENT DOCUMENTS

| | | | |
|---|---|---|---|
| 1166276 | 4/1963 | Fed. Rep. of Germany | 179/170 D |
| 2137201 | 2/1973 | Fed. Rep. of Germany | 179/170 D |
| 2734411 | 2/1979 | Fed. Rep. of Germany | 179/170 NC |

Primary Examiner—Bernard Konick
Assistant Examiner—Randall P. Myers
Attorney, Agent, or Firm—Karl F. Milde, Jr.

[57] ABSTRACT

A hybrid circuit arrangement for a telecommunication system includes a transformer having a first and a second partial winding connected to a two-wire line. Third and fourth partial windings having a grounded junction are coupled to a receiving branch and a transmitting branch of a four-wire transmission line, respectively. A power supply bridge having a resultant supply resistor and a supply capacitor is inserted between the first two partial windings. The total inductance of these windings equals the supply capacitor value times the squared supply resistor value. An ohmic load resistor terminating the receiving branch has a resistance according to a specific relationship depending on the ratio of turns of the third partial winding divided by those of the first and second partial windings. Finally, there is provided a quadripole network connected by a first input to the fourth partial winding, by a second input to the receiving branch; by a first output to the transmission line, and by a second output to ground. This network composed of a RC-network is designed such that signal portions of a signal received from the receiving branch of the transmission line supplied to the network directly and across the third and fourth partial windings in a phase-shifted condition are superimposed for cancellation.

4 Claims, 3 Drawing Figures

TWO TO FOUR WIRE HYBRID CIRCUIT ARRANGEMENT FOR A PULSE CODE MODULATED TIME MULTIPLEX TELECOMMUNICATION SYSTEM

BACKGROUND OF THE INVENTION

The invention relates to a two to four wire hybrid circuit arrangement for a pulse code modulated time multiplex telecommunications system. The hybrid circuit arrangement couples a two-wire extension line to a four-wire transmission line and, more specifically, has a receiving and a transmitting branch, each branch including a filter with low-pass characteristics, a receiver filter and a transmitter filter.

Hybrid circuit arrangements for telecommunication systems are very well known in the art. Such a circuit arrangement couples a subscriber set or more generally a two-wire extension line to a four-wire transmission line. A main element is a transformer which has to transform output voice signals from the two-wire extension line to a transmitting branch of the four-wire transmission line or to couple input voice signals from the receiving branch of the four-wire transmission line to the two-wire extension line. The principal problem of such a hybrid circuit arrangement is to perform good transmission characteristics in both signalling directions without undue loss while having a high attenuation from the receiving branch to the transmitting branch of the four-wire transmission line.

Another problem in designing such hybrid circuit arrangements is that a non-real line impedance is present on the two-wire side. Well known hybrid circuit arrangements have a frequency-dependent attenuator to compensate this influence. In known hybrid circuit arrangements there is provided on the four-wire side a balancing network comprising among other things, a relatively high additional inductance. Known hybrid circuit arrangements, therefore, have several disadvantages. As pointed out, they have different inductive or capacitive reactances as part of a frequency-dependent attenuator, of a balancing network or of a power supply bridge. Those reactances are relatively difficult to realize as integrated circuits. Circuit arrangements composed of discrete elements, however, are undesirable for reasons of cost and space.

SUMMARY OF THE INVENTION

It is, therefore, a general object of the present invention to provide an improved hybrid circuit arrangement.

It is another object of the invention to provide a hybrid circuit arrangement for a pulse code modulated time multiplex system which is for the most part to be composed of integrated circuits.

It is another object of the invention to provide a two- to four-wire hybrid circuit arrangement having just a real input impedance on the two-wire side of the circuit within the voice frequency range, even if the transformer has to have small dimensions.

A further object of the invention is to provide an improved two- to four-wire hybrid circuit arrangement for a pulse code modulated time multiplex telecommunication system which makes special use of already existing filter networks in a receiving branch and a transmitting branch of the four-wire transmission line.

In the present invention a two- to four-wire hybrid circuit arrangement provides a transformer with a first and a second partial winding connected to respective wires of the extension (e.g. subscriber) line and a third and a fourth partial winding connected to the receiving branch and the transmitting branch of the transmission line, respectively. Between the two partial windings on the two-wire side of the transformer, a power (voltage) supply bridge having a resultant supply resistor and supply capacitor is inserted. The first and the second windings are equally designed and the supply bridge is designed such that the total inductance of these two windings equals the capacity of the supply capacitor times the squared value of the resistance of the supply resistor. Within the receiving circuit connected to the receiving branch of the transmission line and including the grounded third partial winding of the transformer an ohmic load resistor is inserted. The resistance value of this load resistor is determined by the equation:

$$R_A = R_S(w_3/(w_1+w_2))^2 - R_{w3},$$

wherein $R_A$ = the value of the load resistor;
$R_S$ = the value of the supply resistor;
$w_n$ = the number of turns of the n-th partial winding with
  n = 1, 2, or 3; and
$R_{w3}$ = the value of the ohmic resistance of the third partial winding.

Additionally, a grounded quadripole network which is connected in the transmitting branch of the transmission line has one input connected to the fourth partial winding of the transformer and a second input connected to the output of the receiver filter. One of the outputs of the network is connected to the transmitter filter, and the other output is grounded. This quadripole network is composed of resistors and at least another capacitor and is designed such that an output signal of the receiver filter supplied to the quadripole network directly and additionally via the magnetically coupled third and fourth partial windings of the transformer is superimposed to perform high cross-talk attenuation.

This hybrid circuit arrangement is designed such that the input impedance of the circuit on the two-wire side of the transformer is independent of the ratio of the total inductance of the first and second partial windings and of the capacitance of the supply bridge capacitor. Therefore, a small transformer with correspondingly small inductances can be used. Besides saving space, the reduction of the inductance has the further advantage that the ohmic resistances of the windings are kept small. Thus, the temperature dependence of the hybrid circuit arrangement can be made negligibly small. Moreover, thereby it is accomplished that a balancing network with an inductance susceptable coil is obviated. As a very simple quadripole network of ohmic resistances attenuation of the signal energy coupled over from the receiving branch to the transmitting branch of the four-wire transmission line is achieved. The value of the attenuation is at least as good as in conventional hybrid circuits comprising a balancing network constructed of a coil. As low-pass filters are necessary parts of coding and decoding networks in a PCM telecommunications exchange system, a residual frequency response of the cross-talk attenuation is easily compensated by proper dimensions of those filters. Additional compensating networks can be avoided which, in turn, means saving of costs for a hybrid circuit arrangement that is to be widely used in telephone exchange systems to connect an extension line to the transmission line.

BRIEF DESCRIPTION OF THE DRAWINGS

The above-mentioned and other features and objects of this invention and the manner of obtaining them will become more apparent, and the invention itself will be best understood by reference to the following description of preferred embodiments of the invention, taken in conjunction with the accompanying drawings, wherein.

DETAILED DESCRIPTION OF PREFERRED EMBODIMENTS

Figure 1:
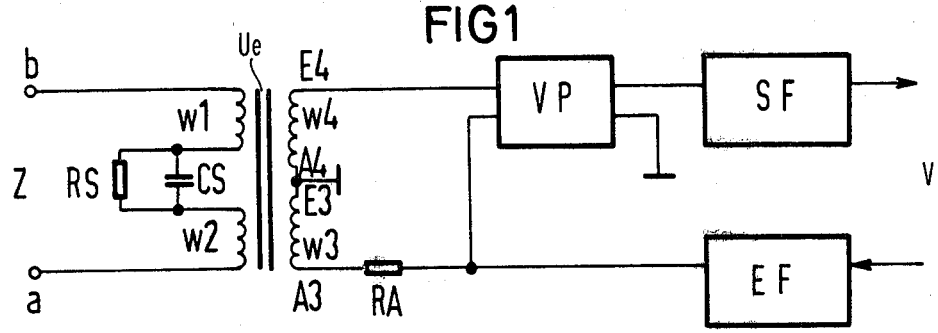
FIG. 1 is a schematic circuit diagram showing a hybrid circuit arrangement according to one embodiment of the invention.

The circuit arrangement shown in FIG. 1 can be understood as a part of a subscriber extension line which is connectable with a telecommunications subscriber station via a two-wire line Z comprising two conductors a and b. Subscriber stations have to be supplied to supply voltage. This is achieved by a supply bridge which is schematically indicated by a resultant supply resistor RS and a supply capacitor CS connected in parallel with the supply resistor RS. The supply bridge is arranged between two partial windings w1 and w2 of a transformer Ue and connected in series with those windings. The two partial windings w1 and w2 constitute the two-wire side of the transformer Ue of the hybrid circuit. The four-wire side of the transformer Ue is formed of two more partial windings w3 and w4.

The third partial winding w3 having leads A3 and E3 is connected in series with a fourth partial winding w4 having leads A4 and E4. A common connector tap E3/A4 is connected to ground. The third partial winding w3 forms a part of a receiving branch of a four-wire transmission line V; the fourth partial winding w4 lies in a transmitting branch of this four-wire transmission line.

As schematically shown in FIG. 1, two low-pass filters are part of the network of the four-wire transmission line. The transmitting branch of the four-wire transmission line V is provided with a transmitting filter SF whereas a receiver filter EF lies in the receiving branch of the four-wire transmission line V. The objects of these filters are very well known to those skilled in the art and familiar with PCM telephone exchange systems. In these digital switching systems the analog (e.g. voice signals fed into the four-wire transmission line have to be converted into digital signals. Incoming digital signals in the opposite signalling direction have to be decoded and converted into analog (voice) signals. This encoding and decoding procedure is preformed by coding and decoding networks called CODECS, which comprise low-pass filters both at the input side for the outgoing signalling direction and at the output side for the incoming signalling direction. The transmitter filter SF lying in the transmitting branch of the four-wire transmission line V has a high input impedance whereas the receiver filter EF lying in the receiving branch of the four-wire transmission line V has a low output impedance. The reason for this design is to achieve high cross-talk attenuation from the receiving branch to the transmitting branch of the four-wire transmission line V without undue influence on the operation of the hybrid circuit.

The total inductance of the first and second partial windings w1 and w2, the resistance value of the resultant supply resistor RS, and the capacitance of the supply capacitor CS are rated according to the equation $L1 + L2 = CS \times RS^2$. To those skilled in the art it will be apparent that this design results in an ohmic load resistance of the two-wire side of the hybrid transformer which is at least frequency independent in the frequency range of the analog voice signals.

The receiving branch of the four-wire transmission line comprises, furthermore, a load resistor RA terminating the receiving branch. In the embodiment of FIG. 1 this load resistor is inserted between the output of the receiver filter EF and the third partial winding w3 of the transformer. The resistance value of this load resistor RA is dependent upon the resistance value of the resultant supply resistor RS, the ratio of the number of turns of the third partial winding w3 lying in the receiving branch of the four-wire transmission line to the first and second partial windings w1 and w2, and on the ohmic resistance Rw3 of the third partial winding. The exact relationship is defined by the equation:

$$R_A = R_S(w_3/(w_1+w_2))^2 - R_{w3}$$

Figure 3:
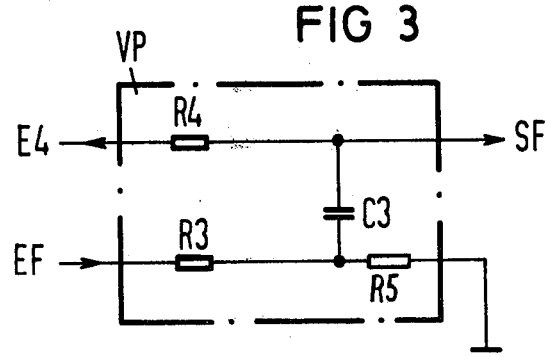
FIG. 3 is a circuit diagram showing one embodiment of the quadripole network which may be used as an attenuation network in either one of the embodiments of FIG. 1 or 2.

To perform a high cross-talk attenuation of the hybrid circuit arrangement, a quadripole network VP, additionally is provided in the transmitting branch of the four-wire transmission line V. As FIG. 3 shows, the quadripole network VP having two inputs and two outputs may be comprised of three further resistors R3, R4 and R5 and another capacitor C3. At one of the inputs of the quadripole network VP the output of the receiver filter EF is connected with the third resistor R3 which, in turn, is connected through a high impedance, such as resistor R5, to ground at one of the outputs of the quadripole network VP. At the other input of the quadripole network VP lead E4 of the fourth partial winding w4 is connected to the fourth resistor R4 which, in turn, is connected to the input of the transmitter filter SF. The capacitor C3 bridges the two leads of the resistors R3 and R4 opposite the respective input connection.

This quadripole network VP connected to the receiver filter EF and inserted into the transmitting branch of the four-wire transmission line V, together with the remaining features of the hybrid circuit arrangement, described above, effects a high cross-talk attenuation between the receiving branch and the transmitting branch of the four-wire transmitting line. An analog voice signal occuring at the output of the receiver filter EF is fed to one input of the quadripole network directly and to the third partial winding w3 of the transformer Ue. The analog signal induces an analog signal in the fourth partial winding w4 of the transformer Ue. This analog signal when supplied to the other input of the quadripole network VP, is phase-shifted by about 180° relative to the original analog signal which is directly supplied to the first input of the quadripole network VP. The original analog signal and the derived phase-shifted signal are both superimposed in the quadripole network. The resistance values of the resistors R3 and R4 and the value of the capacitor C3 are rated such that the superimposed output signal which reaches the transmitter filter SF is small in accordance with the desired cross-talk attenuation. The capacitor C3 bridging the outputs of the quadripole network VP hereby insures that the attenuation of the hybrid circuit arrangement remains essentially constant in the entire speech range of a voice signal.

Figure 2:
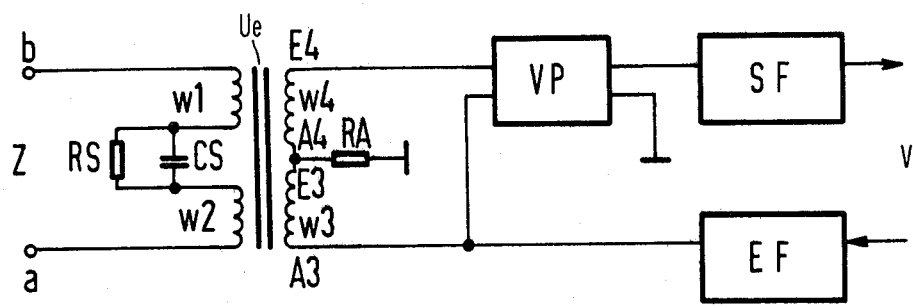
FIG. 2 is another schematic diagram showing a second hybrid circuit arrangement of some different design.

FIG. 2 shows another embodiment of the invention having the same main features in a slightly different design. The load resistor RA instead of being inserted between the receiver filter EF and the third partial winding w3 is connected to the connector tap E3/A4 and, in turn, connected to ground. In this case, both partial windings w3 and w4 on the four-wire side of the transformer Ue contribute to transmitting outgoing analog signals from the two-wire line Z to the transmitting branch of the four-wire transmitting line V. Taking this into account, the number of turns of the fourth partial winding w4 lying in the transmitting branch of the four-wire transmitting line V is now greater than the number of turns of the third partial winding w3 in the receiving branch. As it was found, a proper ratio of the number of turns is about w4/w3=1.2.

Nevertheless, as both windings contribute to transmitting analog signals across the transformer Ue in the outgoing direction, the attenuation for these transmitting signals is less than in the embodiment according to FIG. 1. Furthermore, an induced signal occurring at the end lead E4 of the fourth partial winding w4 resulting from an incoming analog signal along the receiving branch of the four-wire transmission line is smaller than the respective analog signal in the embodiment of the FIG. 1. For this reason, the resistor R4 of the quadripole network VP connected to the fourth partial winding w4 may be smaller than in the embodiment according to FIG. 1, as this resistor in part balances the phase-shifted input signals of the quadripole network VP, as explained above. The changes of the circuit design result in less dampening of the signal energy which is transmitted from the two-wire extension line Z to the transmitting branch of the four-wire transmitting line V which also has to pass through the quadripole network VP.

While different designs of a two to four-wire hybrid circuit arrangement herein described constitute a preferred embodiment of the invention, it is to be understood that the invention is not limited to this specific detailed design, and that a variety of changes may be made therein without departing from the scope of the invention. It may be well understood by those skilled in the art that the quadripole network and the transmitter filter may be designed to form a common structural unit composed of integrated circuits. Separate building blocks have been shown for better understanding and because of the reason that the filters are used with known PCM telephone exchange systems and form insofar no part of the invention. Furthermore, it may be well taken that adjustments may be made in the circuit design of these filters to balance the attenuation distortions of the hybrid transformer.

I claim:

1. A two to four-wire hybrid circuit arrangement for a pulse code modulated time multiplex telecommunications system coupling a two-wire extension line to a four-wire transmission line having a receiving and a transmitting branch, said branches including a receiver filter and a transmitter filter with low-pass characteristics respectively, said circuit arrangement comprising in combination:

(a) a transformer with four partial windings, each of the first and the second partial winding being equally designed and connected to a respective wire of the extension line, the third and the fourth partial winding being connected in series via a connector tap and being coupled to the receiving branch and the transmitting branch of the transmission line, respectively, said connector tap being connected to ground;

(b) a power supply bridge having a resultant supply resistor and a supply capacitor inserted between said first and said second partial winding; said transformer and said supply bridge providing an input impedance on the two-wire extension line independent of the total transformer inductance and the supply capacitor's capacitance and being designed such that the total inductance of said first and said second windings equals the capacitance of said capacitor times the squared value of the resistance of said ohmic supply resistor;

(c) an ohmic load resistor arranged in the hybrid circuit arrangement connected to the receiving branch of the transmission line; said load resistor forming the terminating resistance at the four-wire side and having a resistance determined by the following equation:

$$R_A = R_S(w_3/(w_1+w_2))^2 - R_{w3}$$

for matching the effective impedance at the two-wire side, whereby:

$R_A$ = the value of the load resistor;
$R_s$ = the value of the resultant supply resistor;
$w_n$ = the number of turns of n partial windings with n=1, 2, or 3; and
$R_{w3}$ = the value of the ohmic resistance of the third partial winding; and (d) a quadripole network provided for eliminating cross-coupling of unwanted signal portions from the receiving branch to the transmitting branch of the transmission line, having two network inputs and two network outputs, the first of the network inputs being connected to the fourth partial winding of the transformer, the first one of said network outputs being connected to the transmitter filter, the second network input being connected to the output of the receiver filter and the second output being connected to ground; said quadripole network being composed of first and second resistors each connected to a respective one of the network inputs, a third resistor connected between said second resistor and said second output, and a capacitor arranged to bridge both said first and second resistors at the side opposite the network inputs, wherein a connection between said first resistor associated with the first network input and the bridging capacitor forms the first network output; said first and second resistors and said bridging capacitor being designed such that an output signal of the receiver filter supplied to the quadripole network directly and via the magnetically coupled third and fourth partial winding of the transformer is superimposed to perform high cross-talk attenuation.

2. The two to four-wire hybrid circuit arrangement as recited in claim 1, wherein said third and fourth partial windings comprise identical numbers of turns and said load resistor is arranged between the output of the receiver filter and the third partial winding.

3. The two to four-wire hybrid circuit arrangement as recited in claim 1, wherein said third and fourth partial windings are designed such that the number of turns of said third winding is less than the number of turns of said fourth winding, and said load resistor is arranged between the connector tap of said third and fourth winding and ground.

4. The two to four-wire hybrid circuit arrangement as recited in claim 3, wherein the receiver filter and the transmitter filter are part of a digital-to-analog and an analog-to-digital converter for pulse code demodulation and modulation of voice signals, said receiver filter having negligible output impedance and said transmitter filter having high input impedance.

* * * * *